June 8, 1926.
A. HARRISON
AUTOMATIC AIR VALVE
Filed June 4, 1921
1,587,644
2 Sheets-Sheet 1
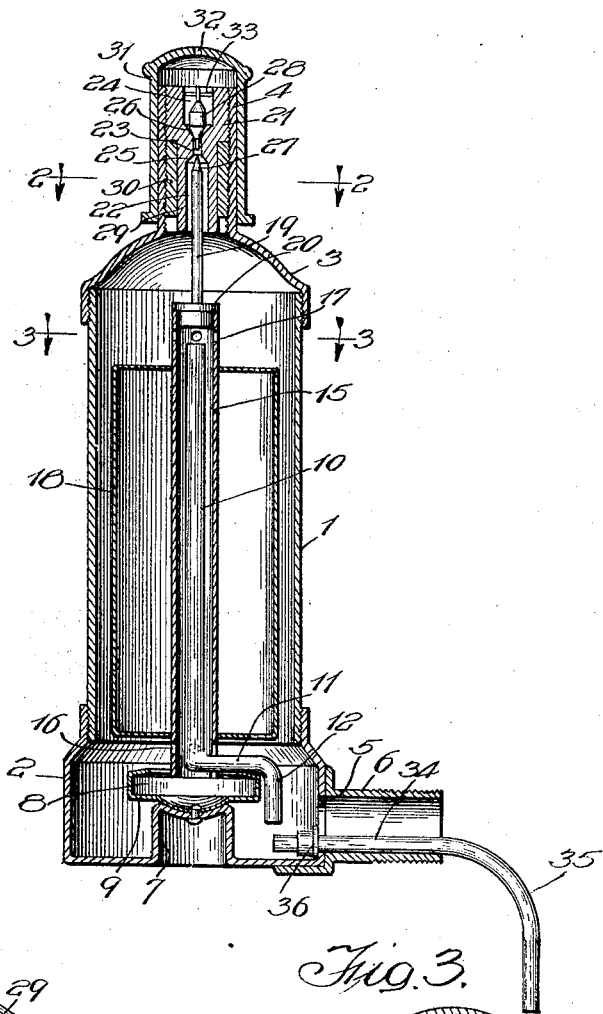
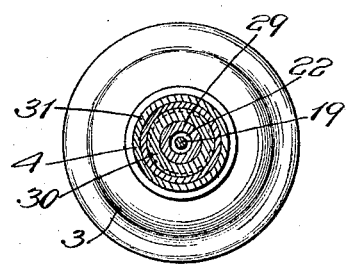
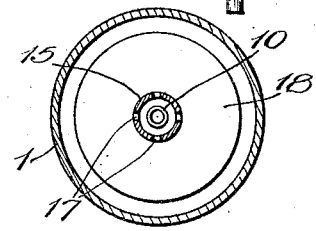
Witnesses:
W. T. Kilroy
Harry R. L. White
Inventor,
Amos Harrison
By Hill & Hill
Attys

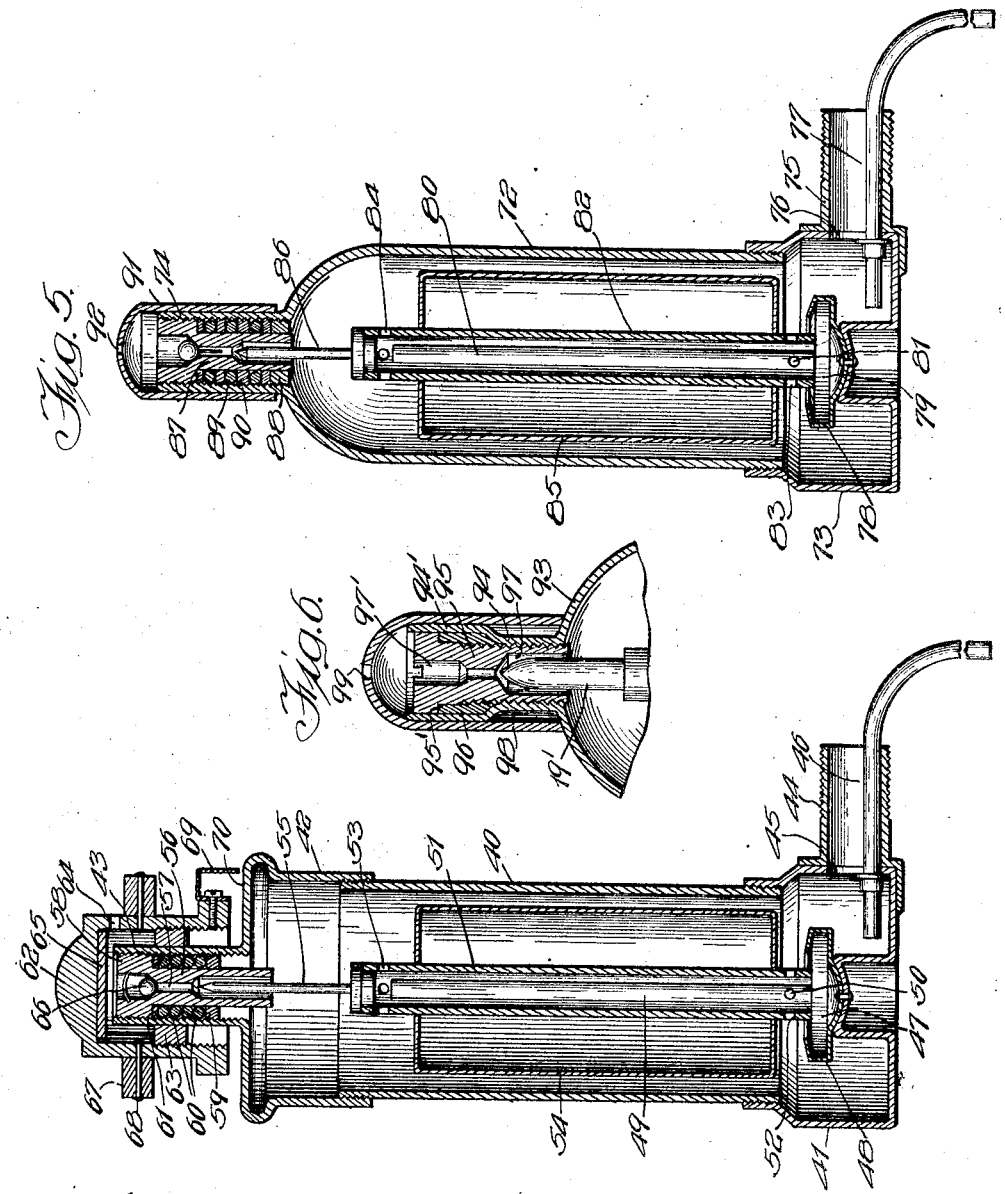

Patented June 8, 1926.

1,587,644

UNITED STATES PATENT OFFICE.

AMOS HARRISON, OF CHICAGO, ILLINOIS, ASSIGNOR TO JAS. P. MARSH & COMPANY, OF CHICAGO, ILLINOIS, A CORPORATION OF ILLINOIS.

AUTOMATIC AIR VALVE.

Application filed June 4, 1921. Serial No. 474,893.

My invention belongs to that general class of devices known as automatic air valves, and relates particularly to a valve for permitting the escape of air from a radiator or the like, but which will prevent the escape or loss of steam when the same reaches the automatic valve. The same also may be arranged to permit the escape of the air, but automatically prevent the air from reentering the valve and radiator when the steam pressure drops. The invention has among its objects the production of a device of the kind described which is simple, compact, efficient, durable, noiseless, inexpensive and satisfactory for use wherever found applicable. It has among its further objects the production of a valve which is automatically operable to prevent the escape of steam or water from the system, but which will not water-log. It has also as an object the production of a construction of the kind described by means of which the air cannot reenter the valve, and consequently the steam will be retained in the radiator when the pressure drops, forming a partial vacuum, which will cause the more rapid operation of the heating system when the pressure again rises. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a sectional view through my improved automatic valve;

Fig. 2 is a cross-sectional view taken substantially on line 2—2 of Fig. 1;

Fig. 3 is a cross-sectional view taken substantially on line 3—3 of Fig. 1;

Fig. 4 is a sectional view similar to Fig. 1, illustrating a slightly different construction;

Fig. 5 is a similar view of another construction; and

Fig. 6 is a sectional view of a portion of a valve illustrating a slightly modified construction.

In the drawings I have illustrated only a few embodiments of the invention for the purposes of illustration. Referring first to Figs. 1 to 3 inclusive, 1 represents a casing or shell of suitable size, shape and material, provided with suitable end closures. As illustrated, the closures in this form are made separate from the body part 1 and suitably secured thereto in any desired manner. At the bottom I arrange an end closure 2, which may be a stamping, as shown, or cast, this being immaterial in so far as the operation of the device is concerned. There is also provided a top closure portion 3, which is extended as at 4, and may be formed similar to the part 2, or in any equivalent manner. The bottom part 2 is provided with an inlet 5, 6 being an extending portion secured thereto and threaded as shown, to engage in the radiator, pipe or the like.

Arranged within the casing is what may be termed a thermo-disk 8, constructed to expand or contract upon variation of the temperature within the casing. Usually, the thermostatic member or disk 8 is chambered and filled with an expansible liquid. As shown, the thermostatic member 8 is mounted on an extending portion 7 in the bottom of part 2, the same being retained in place thereon by a part 9, which may be termed a cage, which is flanged over or provided with prongs which will engage the disk and retain it in place, preventing its disarrangement. The disk 8 carries a tubular stem 10, the lower end of which is offset as at 11, and thence turned down at 12, the same forming substantially a siphon, as will be hereinafter described. Also arranged within the casing and surrounding the tubular stem or tube 10 is a tubular part 15 which may loosely set upon the thermo disk 8, and which carries a float member 18. The tubular part 15 is provided with one or more openings 16 at the bottom, and one or more ports or openings 17 at the top, and carries a valve member 19 arranged on the part 20 carried by the tube and movable therewith.

Arranged in the part 4 or neck of the top closure 3 is a valve seat member 21 arranged to cooperate with the valve 19 and automatically control the passage of the air from the casing. As shown, part 21 is chambered as at 22—24, 23 being a connecting passage, the inner end of which is arranged as at 25 and the outer end as at 26. The end 27 of the valve member 19, 19 being substantially a stem, is arranged to cooperate at the opening 23 when the disk is expanded or the float raised, as will be described in the operation of the device. Arranged in the chamber or recess 24 is a valve member 28, which is provided to prevent re-admission of air into the casing when there is a partial vacuum formed therein owing to the drop in steam pressure. As shown, the valve 28 is reversible so that either end may be used. The same may be maintained in place by one or more cross wires 33 or equivalent means for the purpose. Referring to Fig. 1, it will be noted that the member 21 is provided with an extending portion 29 projecting inwardly and of less diameter than the outer portion, which is constructed to engage the threads on the inner side of the projecting part 4. I prefer to arrange a part 30 on the reduced part 29, which will engage with the threads in the portion 4 and prevent leakage of air or steam thereat. As shown, part 30 is preferably mounted or cast on the portion 29, and consists of a suitable deformable material, preferably zinc or the like, which may be turned down in place, the outer surface of the same being initially smooth, but which will permit the threads on the portion 4 cutting a thread in the part 30, thereby affording a tight, leak-proof fit. Where material of low coefficient of expansion is used for the part 30, the same may fit substantially tight, and yet when the valve is hot, the part 21 may be adjusted up or down without any amount of difficulty.

As shown, I provide a cap 31 for the extending part 4, the same preferably having an opening 32 therein. The cap 31 may be threaded upon the portion 3, or simply slipped on with a tight fit as shown in Fig. 1. At the inlet 5 I prefer to provide a tube 34, which may be termed a siphon tube, the inner end of which preferably extends to adjacent the end of the part 12 of the inner tube and the extreme outer end 35 of which is adapted to extend into a radiator, pipe or the like below the inlet 5. The tube may be secured in place by a transverse pin 36 or equivalent means.

In the operation of the device, as steam is admitted to the radiator, the air therein, if any, enters the inlet 5, passes through the casing, past the valve 27, through the duct 23, past valve member 28, and out through the opening 32 to the atmosphere. Should any steam be admitted to the casing 1, the same immediately acts on the thermo or expansion disk 8, which in expanding raises the tube 15, thereby raising the valve portion 19 and bringing the valve 27 into closed position, and maintaining it in such position as long as there is steam in the automatic valve. Should the pressure drop in the system as the valve cools off, the thermo disk contracts, thereby moving valve 27 to its open position. However, the admission of air to the valve will be prevented by the valve 28, if employed as shown, so that a partial vacuum is formed in the casing 1 and radiator, so that when the pressure in the system again comes up, the movement of the steam to the radiator will be accelerated. Also as the pressure decreases, as before mentioned, the withdrawal of the uncondensed steam from the radiator will be retarded due to the partial vacuum referred to. Should sufficient water enter the casing 1 to raise the float, movement of the float will raise the tube 15, thereby closing valve 27, as previously mentioned. Escape of water from the casing is facilitated by means of the siphon tube 34. Should there be any quantity of water in the casing, the entering steam or air can pass up through the portions 12 and 11, and thence to the inner tube 10, or in the tube 15 about the tube 10, above the level of the contained water, thereby breaking the air lock, so that the water will flow or drain off through the opening 5, for example, through the tube 34. Should the water rise above the ports 17, the steam or air under pressure would cause the water to flow through the port 17 and out through the tube 10, or between the tube 10 and the tube 15, thereby draining the valve without water-logging. It is immaterial through which tube or space the air or water travels, or in which direction, as the same will be siphoned back, owing to the peculiar action, in either case, so that it is impossible for the valve to water-log for any period of time, regardless of conditions. It has been found that the valve is noiseless and free from chattering.

In the construction shown in Fig. 4, 40 represents a shell provided with the heads 41 and 42, providing a chambered casing. Head 42 is provided with the extending portion 43, and the lower head 41 with the projecting part 44 at the inlet 45. I have shown a siphon tube 46 similar to the tube 34 previously described. Arranged within the casing is a thermostatic or expansion disk 47 arranged upon and maintained in place by the retainer or cage 48. The disk 47 carries the tube 49, 50 being a port taking the place of the extended parts 11 and 12 shown in the previous construction. The disk 47 carries the tube 51 having the ports 52 and 53, and provided with a suitable float 54. Tube 51 carries the stem 55 constructed at its end to provide a valve arranged to cooperate with the plug or discharge member 56, provided with the duct or port 57 similar to the other construction previously described. In this case, the portion 56 is of reduced size as compared with the head 58 and projects through a nut or washer 59 carried on the part 43. Arranged between the head 58 and the nut 59 is packing 60 of suitable material, either in the form of rings, or a twine wound around the same. I also prefer to provide a ring 61 between the head 58 and the packing, so that in adjusting the member the same will not tend to disarrange or injure the packing. Obviously, as the nut is adjusted, the packing prevents leakage through the valve other than through the port 57, which is controlled by the valve at the end of the stem 55. With this construction, 62 represents a cap which is threaded on the interior and engages a collar 63 having a suitable thread and secured to the part 43. The cap 62 is provided with a port 64, 65 being a washer of suitable material, preferably packing material, which will bear down on the end of the part 43 when the cap is turned down, so as to entirely prevent the passage of steam or air in either direction from or into the casing. If desired, a valve 66 may also be provided, automatically preventing the admission of air. I have shown the cap 62 as provided with the portion 67, secured in place by pins 68 or the equivalent which forms a finger hold on the cap so that the same may be turned to control the escape of air from the casing. If desired, an indicator 69 may be provided on the cap, the same being adapted to cooperate with suitable characters indicating open or closed (not shown) on the upper face 70 of the end portion 42. The operation of this type of valve is substantially similar to that described. However, in this case, the valve not only automatically controls the escape of air and steam, but the same may be entirely closed so that a certain amount of air may be retained and trapped in the radiator so as to control the radiating area, effective when the steam is on.

The construction shown in Fig. 5 is more or less similar, except that a slightly modified type of casing is shown and the packing about the plug at the top is also of a modified construction. Referring to this figure, 72 represents a tubular shell provided with the lower end closure 73, the upper end 74 being of a reduced size and of the desired length. The casing is provided with the portion 75 at the inlet 76 for attachment to the radiator, and if desired, the tube 77 may also be provided. I have shown a thermo disk 79 arranged in the cage 78, and tube 80 having a port 81 and similar to the previous construction described. Arranged about the tube 80 is a tube 82 having the ports 83 and 84, and carrying float 85. Valve member 86 is carried by the tube and is arranged to cooperate with the adjustable plug 87. Plug 87 has the inner end reduced and projects into the part 88, between which and the plug is arranged packing, consisting of the packing members 89 and 90. Any suitable packing may be employed, and if desired a metallic type of packing may be employed. In this construction a push cap 91 having an opening 92 is arranged over the open end of the valve. The valve may also be provided for preventing the admission of air, as is shown in the figure. The operation of this type of valve is substantially similar to that previously described.

In the construction shown in Fig. 6, 93 represents the casing which is provided with a neck 94, preferably enlarged as at 94' so as the form a shoulder at the inside between the ends, the portion 94 being internally threaded, as shown. Arranged in the neck 94 is a plug 95, which is formed with a head and with a shoulder 95', the lower portion of the plug being threaded to engage the threads in the neck. Packing 96 is arranged, as shown, to prevent the leakage between the plug and neck. The plug is apertured and provided with the recesses 97 and 97', preferably formed with valve seats. The cap 98 is provided with an opening or vent 99. The cap 98 may be secured in place by a friction fit, or soldered or brazed in place, as may be desired. It is believed that the construction will be obvious, the valve stem 19' representing any of the valves previously described, and which is controlled by the mechanism within the device. A check valve similar to that shown in any of the other figures may be arranged in the recess 97' so as to make a vacuum valve if so desired.

Having thus descibed my invention, it is obvious that various immaterial modifications may be made in the same various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. An automatic air valve comprising a casing having an air and liquid inlet at its bottom and an outlet near its top, a tubular float in said casing spaced from the wall thereof, a hollow core extending longitudinally through said float and an open-ended tube within said core, said core being apertured at its top and bottom so as to always be open at said points, and said tube extending from adjacent said inlet to adjacent the top apertures of said core.

2. An automatic air valve comprising a casing having an air and liquid inlet at its bottom and an outlet near its top, a tubular float centrally in said casing and spaced from the casing wall, a hollow core extending axially through said float and apertured at its top above said float and at its bottom end below said float so as to be always open at said points, and an open-ended tube axially within said core and spaced from the inner wall thereof and extending from adjacent said inlet to just below the top apertures of said core.

3. An automatic air valve comprising a casing having an air and liquid inlet at its bottom and an air outlet near its top, a float within said casing and spaced from the wall thereof, a hollow core extending centrally through said float and apertured at both ends, the upper aperture being above said float and the lower aperture arranged to be open at all times, and an open-ended tube positioned centrally through said core, spaced from the wall thereof and having its upper end just below the upper aperture of said core and its lower end extended through said core to adjacent said inlet.

4. An automatic air valve comprising a casing having an air and liquid inlet at its bottom and an air outlet near its top, a float within said casing and spaced from the wall thereof, a hollow core extending axially through said float and being apertured at both ends, an open ended tube extending axially of said core spaced from the wall thereof and having its lower end extended therethrough, the top of said tube being below the top apertures of the core, and a tube positioned in said inlet and extending downwardly and outwardly thereof, whereby the liquid in said casing will be siphoned downwardly of said casing and outwardly through said last mentioned tube by the air entering said casing through said inlet.

5. An automatic air valve comprising a casing having an air and liquid inlet at its bottom end and an outlet near its top, a tubular float centrally in said casing and spaced from the casing wall to form an annular chamber therewith, a hollow core extending axially through said float and apertured at its top and bottom ends so as to be always open at said points, and an open-ended tube axially within said core and forming a chamber with the inner core wall, said tube extending from below the upper aperture of said core through the lower aperture to adjacent said inlet, whereby liquid in said casing will be siphoned downwardly of said casing through either of said chambers and out through said inlet by the rising air entering through said inlet.

6. An automatic air valve comprising a casing having an air and liquid inlet at its bottom and an air outlet adjacent its top, a float within said casing and spaced from the wall thereof, a hollow core extending axially through said float and apertured at both ends, a tube open at both its ends arranged axially within said core and spaced from the wall thereof and having its lower end extended therethrough, the top of said tube being below the top aperture of the core, and thermostatic means for controlling the float.

In testimony whereof, I have hereunto signed my name.

AMOS HARRISON.